United States Patent [19]
Guillemette

[11] Patent Number: 5,499,469
[45] Date of Patent: Mar. 19, 1996

[54] FISH HOOK SETTING DEVICE

[76] Inventor: Jean-Guy Guillemette, 613 Maloney Est, Gatineau, Quebec, Canada, G8P 1J2

[21] Appl. No.: 375,153

[22] Filed: Jan. 18, 1995

[30] Foreign Application Priority Data

Jan. 18, 1994 [CA] Canada ................................. 2113704

[51] Int. Cl.⁶ ................................................ A01K 97/12
[52] U.S. Cl. ........................................ 43/16; 43/25
[58] Field of Search ................................. 43/15, 16, 17, 43/25

[56] References Cited

U.S. PATENT DOCUMENTS

| | | |
|---|---|---|
| 625,829 | 5/1899 | Cook . |
| 1,576,233 | 3/1926 | Cook . |
| 2,552,516 | 5/1951 | Camp ........................................ 43/15 |
| 2,590,721 | 3/1952 | Muth ........................................ 43/15 |
| 2,612,713 | 10/1952 | Jenkins .................................... 43/15 |
| 2,640,290 | 6/1953 | Ames ....................................... 43/15 |
| 2,657,493 | 11/1953 | Coles ....................................... 43/16 |
| 2,821,804 | 2/1958 | Smith ....................................... 43/15 |
| 2,850,831 | 9/1958 | Setterdahl ................................ 43/15 |
| 2,851,811 | 9/1958 | Mantell ................................... 43/15 |
| 2,899,768 | 8/1959 | Steinauer ................................ 43/15 |
| 2,948,981 | 8/1960 | Kowalczyk ............................. 43/16 |
| 3,459,387 | 8/1969 | Miyamae . |
| 3,571,963 | 3/1971 | Ledbetter . |
| 4,177,594 | 12/1979 | Kim ........................................ 43/15 |
| 4,212,125 | 7/1980 | Kim . |
| 4,627,186 | 12/1986 | Wang . |
| 4,651,459 | 3/1987 | Wurtz . |
| 4,890,409 | 1/1990 | Morgan et al. . |
| 5,056,255 | 10/1991 | Campbell . |

*Primary Examiner*—Kurt Rowan
*Attorney, Agent, or Firm*—Browdy and Neimark

[57] ABSTRACT

A fish hook setting device is disclosed comprising a housing having side walls, end walls and a bottom wall. A solenoid is secured within the housing and is activated by a solenoid actuator. The actuator is operatively associated with a fishing line and responds to line weight. The actuation of the solenoid causes the fishing line to be pulled up a predetermined distance. The device also comprises means for deactivating the solenoid. Upon deactivation, the elements of the device return to their starting position and the device can be activated once more.

5 Claims, 4 Drawing Sheets

FISH HOOK SETTING DEVICE

FIELD OF INVENTION

This invention relates to a fish hook setting device, in particular, to a device which is adapted to pull a fishing line a predetermined distance in response to the weight of a fish on the line.

BACKGROUND OF INVENTION

Various types of hook setting devices are known. For example, U.S. Pat. Nos. 3,571,963; 4,212,125 and 4,627,186 disclose a hook setting fishing rod attachment which causes the fishing rod to tip upwardly in order to pull the fishing line thereby hooking the biting fish. U.S. Pat. No. 4,651,459 discloses an automatic fishing device adapted for ice fishing. It comprises a winding mechanism connected to the spool for automatically rotating the spool and winding the fishing line. The mechanism is connected to a mounting assembly which is connected to a platform when the apparatus is used for ice fishing. An adjustable trip mechanism is positioned between the spool and the platform. Stop members are positioned on the fishing line to halt the rotation of the spool. The device is complex in its construction and its operation.

The device of the present invention is adapted to pull up the fishing line a predetermined distance in response to a fish biting the bait. The line can be pulled up a given distance repeatedly in response to bites on the line. This is a feature which is absent from conventional fish setting devices which must be reset by the fisherman after each use. The present device resets automatically.

SUMMARY OF THE INVENTION

In one broad aspect, the invention relates to a fish hook setting device comprising a housing having side walls, end walls and a bottom wall. The housing is adapted to be secured to a fishing rod at a point intermediate a handle portion and tip portion of the rod. A solenoid is secured within said housing and is operatively associated with a power source. A solenoid actuator is operatively associated with a fishing line so that the solenoid actuator is activated by the weight of said line. A bearing is secured to one of the side walls of the housing. A first shaft extends in a direction generally perpendicular to the side walls. A first end portion of said first shaft is secured to the bearing. A second shaft is spaced from said first shaft and extends parallel thereto. A first end portion of said second shaft is secured to the side wall of said housing spaced from said bearing. The device further comprises linkage means transferring rotary movement of first shaft to said second shaft. The linkage means are secured to said first and second shafts adjacent the second end portions of said shafts. Bracket means support the fishing line on the outside of the side wall of the housing and are secured to the second end portions of said first and second shafts. The actuation of the solenoid causes the rotation of the bearing, which in turn causes the rotation of the first shaft and of the second shaft, so that the bracket means rotate causing the fishing line to be pulled up a predetermined distance to set the hook in a fish's mouth. Means for deactivating the solenoid are operatively associated with the second shaft. Upon deactivation of the solenoid, spring return means cause the bearing, the first and second shafts, the linkage means and the bracket means to return to their starting position.

BRIEF DESCRIPTION OF THE DRAWINGS

The invention will be better understood through the following detailed description of the preferred embodiment in conjunction with the accompanying drawings in which.

DETAILED DESCRIPTION

Figure 1:
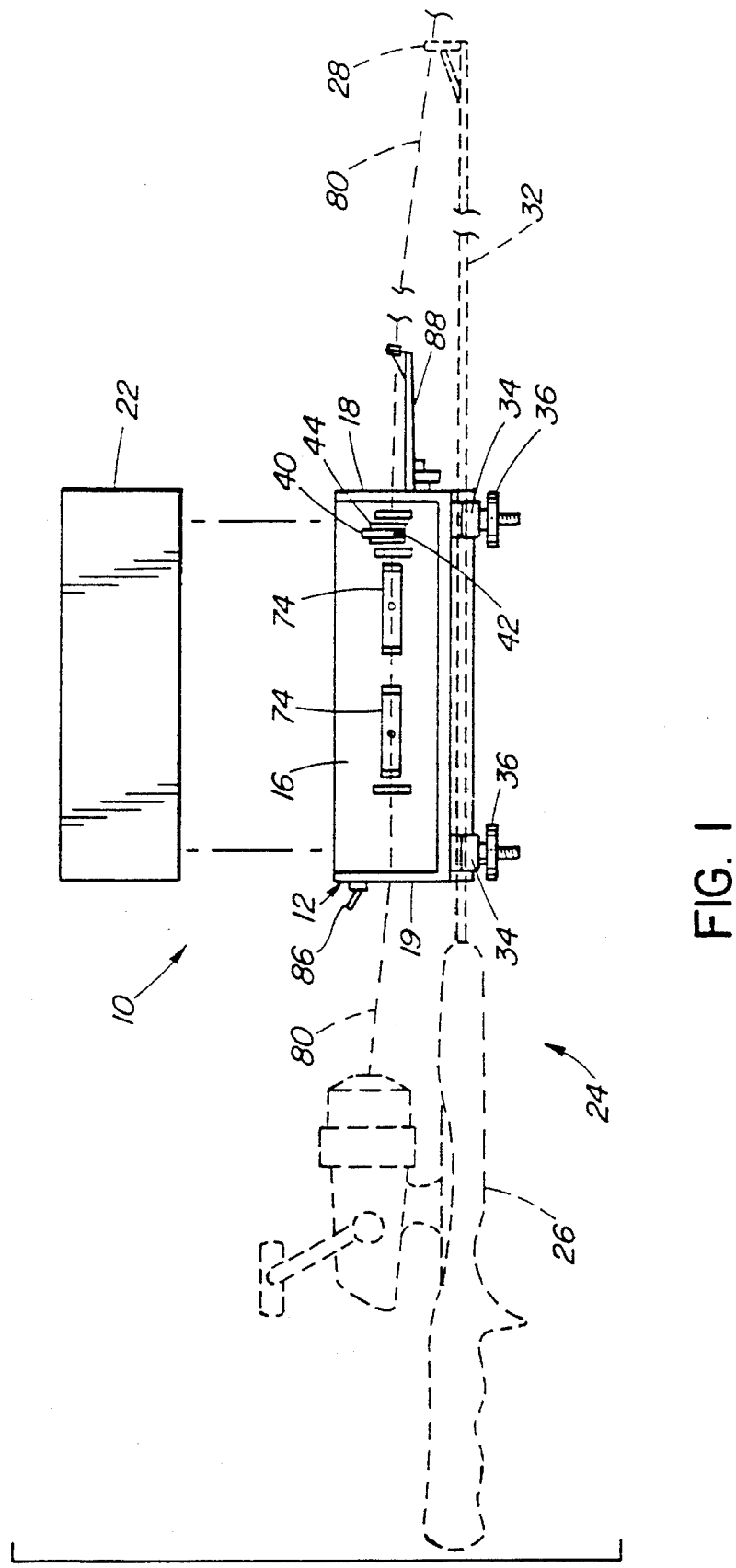
FIG. 1 is a side view of the device of the present invention, prior to activation, with the cover removed.
Figure 2:
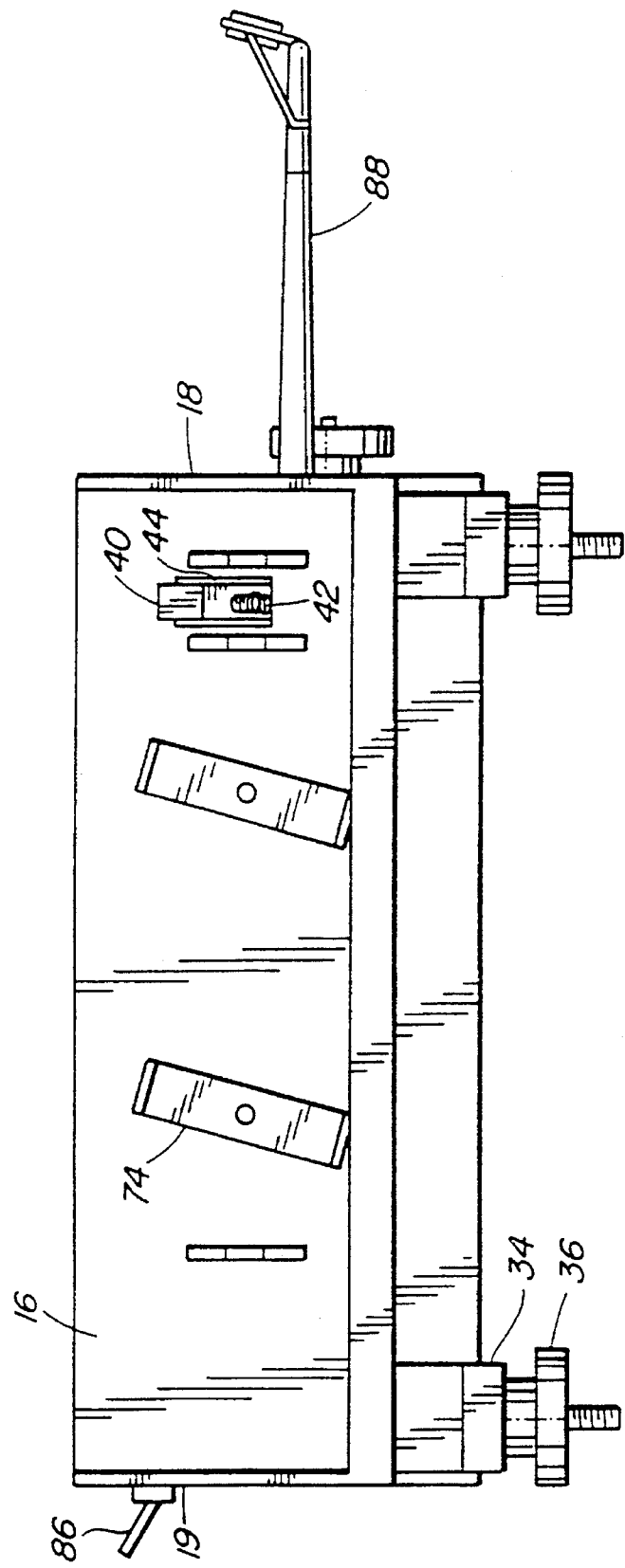
FIG. 2 is a side view of the device of the present invention without the cover after activation.
Figure 3:
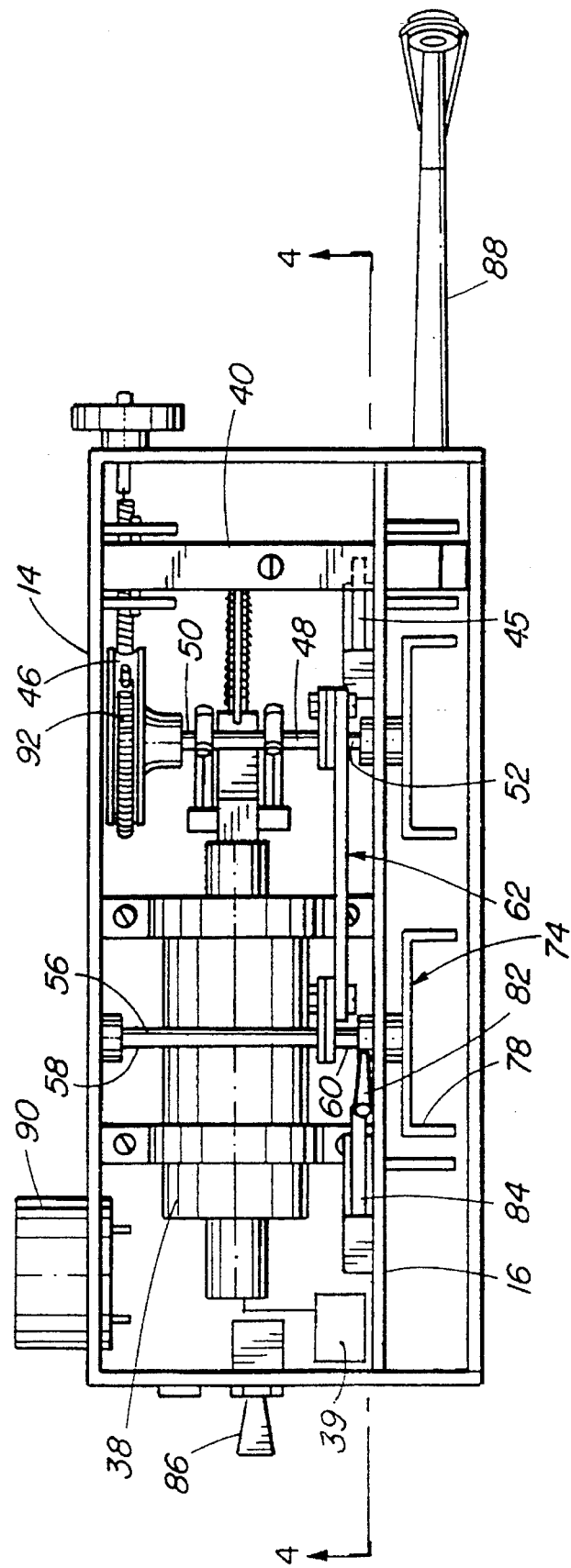
FIG. 3 is a top view of the device of the present invention.
Figure 4:
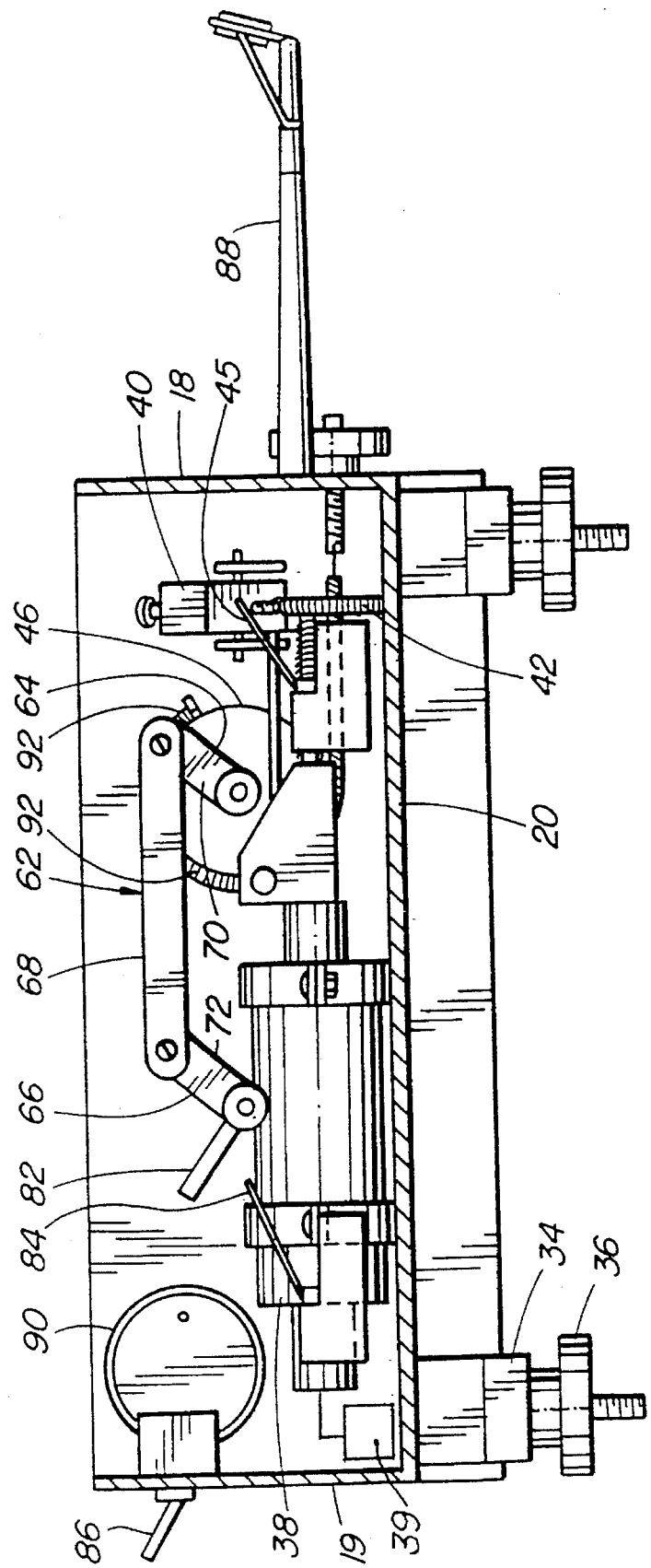
FIG. 4 is a cross-sectional view of the device taken along line 4—4 of FIG. 3.

Referring to the drawings, a fish hook setting device indicated generally as 10 comprises a housing 12 having side walls 14 and 16, end walls 18 and 19 and bottom wall 20. A cover 22 is adapted to slide over the open ended portion of the housing 12 and side wall 16 as illustrated in FIG. 1. The housing 12 is adapted to be secured to a fishing rod 24 at a position intermediate the handle portion 26 of the fishing rod 24 and the tip of portion 28 of the rod 24. The bottom wall 20 has a recess adapted to receive the shaft portion 32 of the fishing rod 24. Two tab members 34 are secured to the bottom wall 20 by means of bolts 36. The inside surface of the tab members 34 has a shape complementary to the shaft portion 32 of the fishing rod 24. A plunger type solenoid 38 is secured within the housing as illustrated in FIG. 4. The solenoid 38 is connected to a power source such as a battery (not shown). A solenoid actuator 40 is pivotally secured inside of the side wall 14 of the housing 12. The actuator 40 is an elongated rectangular member which is biased by means of a spring 42. The solenoid actuator 40 protrudes through an aperture 44 in the side wall 16. The solenoid 38 is actuated when the downward movement of the actuator 40 in response to the tension on the line causes the first contact switch 45 secured to the inside of the housing 12 to be depressed thereby actuating the solenoid 38.

A bearing 46 is secured to the inside of the side wall 14 of the housing 12. A first shaft 48 extends at right angle to the side walls 14 and 16. The first shaft 48 has a first end portion 50 and a second end portion 52. The first end portion 50 is secured in a central aperture of the bearing 46. The second end portion 52 of the first shaft 48 is pivotally secured to the side wall 16 of the housing 12. A second shaft 56 is spaced apart from the first shaft 48 and extends parallel thereto. The first end portion 58 of the second shaft 56 is pivotally secured to the side wall 14 while the second end portion 60 of the second shaft 56 is pivotally secured to the side wall 16.

A U-shaped linkage 62 is secured to the inside of side wall 16 onto the first shaft 48 and second shaft 56 adjacent their second end portions 52 and 60 respectively. The U-shaped linkage 62 comprises a pair of parallel links 64 and 66 pivotally secured to an interconnecting link 68. The free end 70 of the first parallel link 64 is pivotally secured to the first shaft 48 while the free end 72 of the second parallel link 66 is pivotally secured to the second shaft 56.

A pair of U-shaped brackets 74 are pivotally secured to the outside of the side wall 16 to the second end portion 52 of the first shaft 48 and the second end portion 60 of the second shaft 56 respectively. Apertures are located in the legs 78 of the U-shaped brackets 74 and are adapted to receive and support a fishing line 80.

The solenoid 38 is deactivated by means of an elongated member 82 which upon rotation of the second shaft 56 will come into contact with a second contact switch 84 thereby deactivating the solenoid, as described below.

An on/off switch 86 is located in the end wall 19 of the housing 12 and is used to turn the hook setting device on or off.

A line guide 88 is secured to the outside of the end wall 18 of the housing 12.

In a preferred embodiment, an alarm 90 is connected to the solenoid 38 so that activation of the solenoid in turn causes an alarm to sound.

In use, the fish hook setting device 10 is secured to the fishing rod 24 by undoing the bolts 36 and placing the shaft portion 32 of the fishing rod 24 into the recesses of the bottom wall 20 and the recesses of the tab members 34. The bolts 36 are then tightened. The fishing line 80 is then threaded through the apertures provided in the first end wall, the apertures in the U-shaped brackets 74, the aperture provided in the solenoid actuator 40 and a further aperture provided in the second end wall 18 of the housing 12. The line is then threaded in the line guide 88 and on the shaft portion 32 and the tip portion 28 of the fishing rod 24 in the conventional way. The fishing line is unwound into the water. Any tension on the line 80 will cause the solenoid actuator 40 to be lowered thereby causing the first contact switch 45 to be depressed resulting in the actuation of the solenoid 38. This will activate the solenoid 38 causing the bearing 46 and the first shaft 48 mounted therein to rotate. The U-shaped linkage 62 transfers the rotary movement of the first shaft 48 to the second shaft 56. The rotation of the first shaft 48 and the second shaft 56 also causes rotation of the U-shaped brackets 74 which carry the fishing line 80. As the U-shaped brackets 74 rotate, the fishing line is pulled up a given distance which is determined by the size of the said brackets. This causes the hook to be set in the mouth of the fish biting on the line. As the second shaft 56 rotates, so does the elongated member 82 attached thereto. The member 82 eventually contacts the contact switch 84 thereby deactivating the solenoid. As the solenoid is deactivated, a spring 92 secured about said bearing causes the bearing 46 to rotate in a clockwise direction and return to its starting position along with the U-shaped linkage 62 and the brackets 74. A first end of spring 92 is secured to the bearing 46 while the second end thereof is secured to the side wall 18.

In a preferred embodiment, an alarm 90 can be connected to the solenoid 38 so that an alarm sounds when the solenoid 38 is activated thereby warning the fisherman that a fish is biting.

While the present invention has been described in connection with a specific embodiment thereof and in a specific use, various modifications will occur to those skilled in the art without departing from the spirit and the scope of the invention as set forth in the appended claims. I wish to embody within the scope of the patent which may be granted hereon, all such embodiments as reasonably and properly come within the scope of my contribution to the art.

The embodiments of the invention in which an exclusive property or privilege is claimed are defined as follows:

1. A fish hook setting device comprising
    a housing having side walls, end walls and a bottom wall; said housing being adapted to be secured to a fishing rod at a point intermediate a handle portion and tip portion of said rod;
    a solenoid secured within said housing;
    said solenoid being operatively associated with a power source;
    a solenoid actuator operatively associated with a fishing line so that the solenoid actuator is activated by the tension on said line;
    a bearing secured to one of the side walls of the housing,
    a first shaft extending in a direction generally perpendicular to the side walls, a first end portion of said first shaft being secured to said bearing;
    a second shaft being spaced from said first shaft and extending parallel thereto, a first end portion of said second shaft being secured to said side wall of said housing spaced from said bearing;
    linkage means transferring rotary movement of first shaft to said second shaft, said linkage means being secured to said first and second shafts adjacent the second end portions of said shafts;
    line support means for supporting the fishing line on the outside of the side wall of the housing, said line support means being secured to second end portions of said first and second shafts;
    the actuation of said solenoid causing the rotation of the bearing, which in turn causes the rotation of the first shaft and of the second shaft, so that the line support means rotate causing the fishing line to be pulled up a predetermined distance to set the hook in a fish's mouth; means for deactivating the solenoid operatively associated with said second shaft;
    spring return means causing the bearing, the first and second shafts, the linkage means and the line support means upon deactivation of the solenoid to return to their starting position.

2. The device of claim 1 including alarm means responsive to actuation of solenoid.

3. The device of claim 1 wherein the solenoid is a plunger type solenoid.

4. The device of claim 1 wherein the linkage means comprise a pair of parallel links which are pivotally secured to an interconnecting link.

5. The device of claim 1 wherein the means for deactivating the solenoid comprise an elongated member secured intermediate the linkage means and the line support means on the second shaft, said elongated member moving with said second shaft and upon rotation of the second shaft contacting a contact switch which causes deactivation of the said solenoid.

* * * * *